United States Patent
Hodnefjell et al.

(10) Patent No.: US 7,992,457 B2
(45) Date of Patent: Aug. 9, 2011

(54) ACTUATOR DEVICE

(75) Inventors: Lars Gunnar Hodnefjell, Mosteroy (NO); Stale Hope, Vestskogen (NO)

(73) Assignee: Ifokus Engineering AS, Stavanger (NO)

( * ) Notice: Subject to any disclaimer, the term of this patent is extended or adjusted under 35 U.S.C. 154(b) by 541 days.

(21) Appl. No.: 12/065,163

(22) PCT Filed: Aug. 28, 2006

(86) PCT No.: PCT/NO2006/000305
§ 371 (c)(1),
(2), (4) Date: May 15, 2008

(87) PCT Pub. No.: WO2007/027097
PCT Pub. Date: Mar. 8, 2007

(65) Prior Publication Data
US 2008/0236313 A1    Oct. 2, 2008

(30) Foreign Application Priority Data
Aug. 31, 2005 (NO) .................................. 20054037

(51) Int. Cl.
*F16H 29/02* (2006.01)
(52) U.S. Cl. .................................................. 74/89.39
(58) Field of Classification Search ........... 74/89, 89.23, 74/89.25, 89.32, 89.33, 89.39, 424.71, 606 R
See application file for complete search history.

(56) References Cited

U.S. PATENT DOCUMENTS

| | | | |
|---|---|---|---|
| 2,930,571 A | 3/1960 | Vogl | |
| 5,195,721 A | 3/1993 | Akkerman | |
| 5,497,672 A | 3/1996 | Appleford et al. | |
| 5,984,260 A * | 11/1999 | Rawson et al. | 251/71 |
| 6,152,167 A * | 11/2000 | Baker | 137/458 |
| 7,658,365 B2 * | 2/2010 | Eschborn et al. | 251/267 |

FOREIGN PATENT DOCUMENTS
EP    0981001 A2    2/2000

OTHER PUBLICATIONS
PCT Office, "Written Opinion of the International Searching Authority," PCT Office, (Dec. 8, 2006).

* cited by examiner

*Primary Examiner* — Vicky A Johnson
(74) *Attorney, Agent, or Firm* — GableGotwals

(57) ABSTRACT

An actuator device (1) comprising an actuator housing (2), a driving motor (4) attached to the actuator housing (2), which driving motor (4) is provided with a motor spindle (28), the motor spindle (28) being displaceably engaged with an actuator spindle (6) via a nut (38), and where an auxiliary frame (8) which can be displaced relative to the actuator spindle (6) and biased by use of the driving motor (4), and which can be releasably coupled to the actuator housing (2), is arranged to displace the actuator spindle (6) independently of the motor (4), and where the nut (38) is releasable coupled to the actuator spindle (6), thereby being arranged to bias the auxiliary frame (8) while disengaged from the actuator spindle (6).

13 Claims, 8 Drawing Sheets

II-II

VII-VII

VII-VII

ACTUATOR DEVICE

CROSS-REFERENCE TO PENDING APPLICATIONS

This application is based on PCT Patent Application No. NO2006/000305, filed on Aug. 28, 2006, which was based on Norwegian Patent Application No. 20054037, filed on Aug. 31, 2005.

This invention regards an actuator. More particularly, it regards an actuator comprising an actuator housing, a driving motor attached to the actuator housing, which driving motor is provided with a motor spindle, the motor spindle being displaceably engaged with an actuator spindle via a nut, and where an auxiliary frame which can be displaced relative to the actuator spindle and biased by use of the driving motor, and which can be releasably coupled to the actuator housing, is arranged to displace the actuator spindle independently of the motor, and where the nut is releasably coupled to the actuator spindle, thereby being arranged to bias the auxiliary frame while disengaged from the actuator spindle.

The invention further regards a coupling comprising a cylindrical body provided with at least one groove for engaging a locking body, wherein the locking body is disposed in a through opening in a retainer ring encircling the cylindrical body, the locking body being prevented from displacing out of engagement with the cylindrical body by a locking ring that encircles the retainer ring. In its simplest form, the locking ring is provided with at least one recess which can be brought into a corresponding position relative to the locking body when the locking ring is rotated about its axial centre line, the locking body being arranged thereby to move out of engagement with the cylindrical body and into the recess.

Actuators are used to carry out various operations that typically include displacement of a body. In the following, the operation of the actuator is illustrated by the actuator being coupled to a valve. Here the actuator is used to switch the valve between a closed and an open position, and optionally to switch it to intermediate positions to regulate the flow through the valve. Although the operation of the actuator is explained by reference to a valve, this does not limit the scope of the invention in any way.

Actuators of the type in question typically comprise an actuator spindle, which can be controllably displaced into and out of an actuator housing.

In the case where the actuator is coupled to a valve, inability of the valve to switch to its safe position due to e.g. a loss of power may have adverse effects. The safe position may be closed or open, depending on the function of the valve.

It is known to provide actuators with tensionable devices that are arranged upon loss of power to move the valve to the safe position.

Thus U.S. Pat. No. 5,497,672 describes an actuator in which a first motor driven spindle engages the valve spindle via threads. The first spindle is coupled by bearings to an auxiliary frame. The auxiliary frame is biased by compressing a spring, the first spindle being screwed down the valve spindle by the motor while the valve spindle is in the upper position where the valve is closed. When the auxiliary frame is in the biased position the auxiliary frame is releasably locked to the actuator housing. The valve may then be opened and closed by the motor in the ordinary manner. If the valve loses power while in the open position, the auxiliary frame will be released from the actuator housing, whereby the spring displaces the valve spindle to the closed position via the auxiliary frame. However, the auxiliary frame of U.S. Pat. No. 5,497,672 cannot be biased unless the valve spindle is in the upper position.

The object of the invention is to remedy or reduce at least one of the drawbacks of prior art.

The object is achieved in accordance with the invention, by the features set forth in the description below and in the following claims.

According to the invention, an actuator comprises an actuator housing and a driving motor attached to the actuator housing, which driving motor is provided with a spindle, the motor spindle being slidably engaged with an actuator spindle via a nut. An auxiliary frame which can be displaced relative to the actuator spindle and biased by use of the driving motor, and which can be releasably coupled to the actuator housing, is arranged to displace the actuator spindle independently of the motor. The nut is releasably coupled to the actuator spindle, thereby being arranged to bias the auxiliary frame while disengaged from the actuator spindle.

Advantageously the nut is located in a spindle tube associated with the actuator spindle. A guide pin rigidly mounted to the auxiliary frame projects into the spindle tube, whereby the nut may abut the guide pin.

The nut and the auxiliary frame may be releasably interconnected with the actuator spindle and the actuator housing, respectively, by first and second couplings, respectively.

In its simplest form the coupling comprises a cylindrical body provided with at least one groove to engage a locking body, the locking body being disposed in a through opening in a retainer ring encircling the cylindrical body. A locking ring that encircles the retainer ring prevents the locking body from disengaging from the cylindrical body. The locking ring is provided with at least one recess which can be brought into a position of correspondence relative to the locking body when the locking ring is rotated about its axial centre line, the locking body being arranged thereby to move out of engagement with the cylindrical body and into the recess.

In another embodiment the coupling comprises the cylindrical body provided with at least one groove to engage the locking body. The locking body is located in the through opening in the retainer ring that encircles the cylindrical body. In the locked position, each locking body abuts a corresponding pivotal locking arm supported by the retainer ring. The locking arm abuts a locking sleeve rotatably supported by an attachment ring via a through locking shaft. A lock bearing arranged on the locking shaft abuts the locking ring. Thus the locking ring encircling the retainer ring prevents the locking body from disengaging from the cylindrical body. Rotating the locking ring and/or the attachment ring about their common axial centre line will move the locking sleeve out of the locking position in a rolling motion, whereby the locking arm may be rotated to the released position.

The rolling action of the locking sleeves greatly reduces the torque required to rotate the locking ring or the attachment ring out from the locking position.

In a further embodiment, which is a slightly simplified version of the previous embodiment, the coupling similarly comprises the cylindrical locking body provided with at least one groove to engage the locking body. The locking body is located in a through opening in the retainer ring that encircles the cylindrical body. In the locked position each locking body abuts the corresponding locking arm pivotal supported by the retainer ring. The locking arm abuts the locking sleeve rotatably supported by the attachment ring via the through locking shaft. Rotation of the attachment ring about its axial centre line will move the locking sleeve out of the locking position in a rolling motion.

This latter embodiment is particularly suitable for use with two or more couplings arranged in parallel.

It may be of relevance to use several couplings in parallel, e.g. when there is a need to build in a weak link. The various couplings may have locking elements of different strengths.

With the groove encircling the cylindrical body the coupling can be rotatable about the cylindrical body, also when it is in the active locked position. If, on the other hand, the grooves are arranged in the axial direction, the coupling is prevented from rotating.

Thus the grooves in the cylindrical body can be formed based on the current coupling requirements.

The following describes a non-limiting example of a preferred embodiment illustrated in the accompanying drawings, in which.

Figure 1:
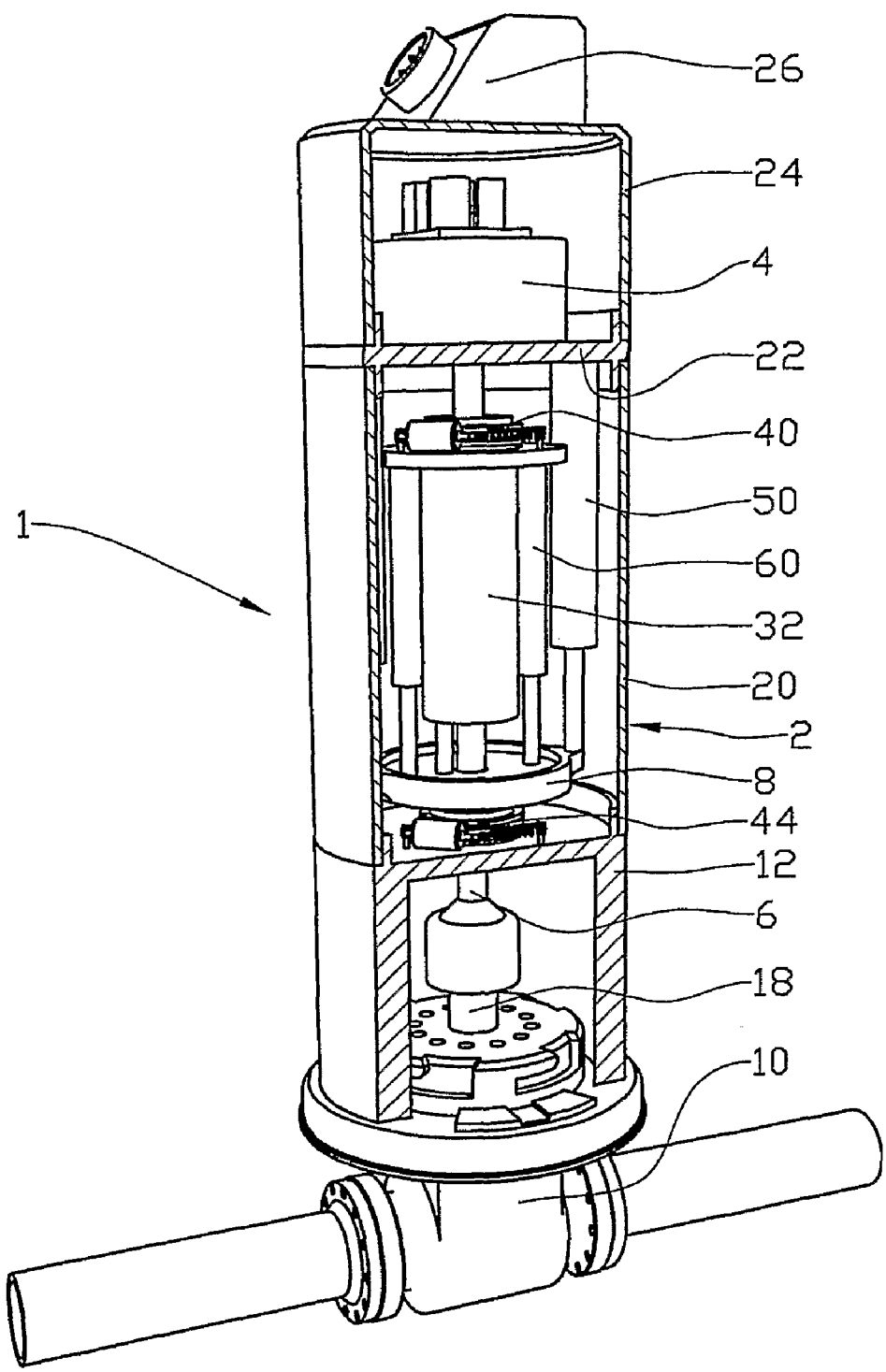
FIG. 1 is a perspective view, partially sectioned, of an actuator of the invention coupled to a valve.

In the drawings, reference number 1 denotes an actuator comprising an actuator housing 2, a motor 4, an actuator spindle 6 and an auxiliary frame 8. The actuator is coupled to a valve 10.

The actuator housing 2 comprises a cylindrical fastening device 12, which is a complementary fit to the valve 10. The part of the fastening device opposite the valve 10 is provided with a bottom portion 14, see FIG. 2, which has a through opening 16 for the actuator spindle 6. The actuator spindle 6 is coupled to a spindle 18 of the valve 10.

The actuator housing 2 further comprises a tube 20 that encloses the actuator spindle 6 and the auxiliary frame 8 and extends from the fastening device 12 to an intermediate plate 22, the motor 4 being coupled to the intermediate plate 22 on the side of the plate 22 facing away from the actuator spindle 6.

A cover 24 enclosing the motor 4 is sealingly coupled to the intermediate plate 22 and provided with the required electrical contacts 26 for powering and controlling the actuator 1.

The spindle 28 of the motor 4 projects through a centred through opening 30 in the intermediate plate 22 and into the actuator spindle 6, which at the end facing the motor spindle 28 comprises a spindle tube 32. The spindle tube 32 and the motor spindle 28 are arranged to be concentric. At the end nearest the motor 4, the spindle tube 32 is provided with an outwardly projecting, enclosing flange 34, and at the opposite end it is interconnected with the stem portion 36 of the actuator spindle 6 via a plate-like intermediate portion 37.

A nut 38 is a complimentary fit to the threads of the motor spindle 28 and may be displaced axially in the spindle tube 32. The nut 38 is releasably coupled to the flange 34 by a first coupling 40. A guide 42 prevents the nut 38 from rotating about its longitudinal axis relative to the actuator spindle 6.

The auxiliary frame 8 is made up of a plate-like element with a centric boss 43 that displaceably encloses the stem portion 36 of the actuator spindle 6. The auxiliary frame 8 is releasably coupled to the bottom portion 14 of the fastening device 12 by a second coupling 44. A guide pin 46 projects from the auxiliary frame 8 through a through opening 48 in the intermediate portion 37 and into the spindle tube 32.

Two spring casings 50 are connected to the intermediate plate 22, projecting in the direction of the auxiliary frame 8. Spring stems 52 similar to pistons rods, corresponding with respective spring casings 50, are coupled to the auxiliary frame 8 and project into their corresponding spring casings 50. A pre-tensioned compression spring 54 extends between the end wall 56 of the spring casing 50 and the flange 58 of the spring stem 52. Thus the compression spring 54 seeks to displace the spring stem 52 into the spring casing 50. Through this, the force from the compression springs 54 also seeks to displace the auxiliary frame 8 in the direction of the motor 4.

The actuator 1 is also provided with telescopic dampers 60 of a type that is known per se, coupled between the flange 34 and the auxiliary frame 8.

Figure 6:
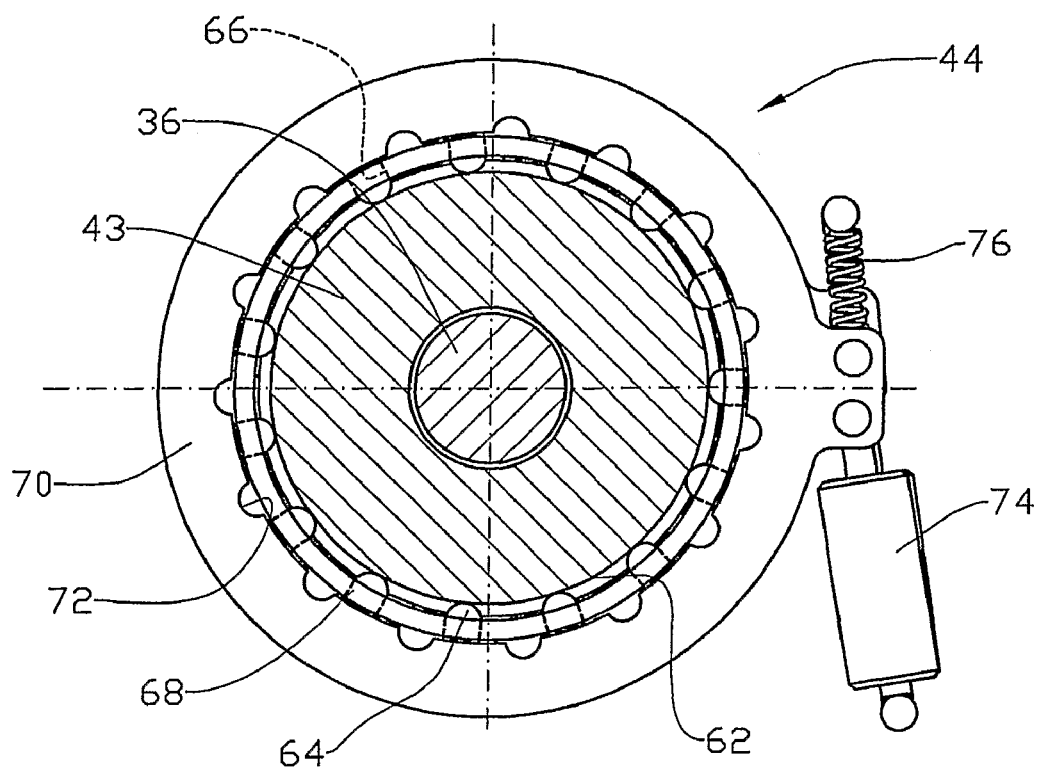
FIG. 6 is a section II-II through a second coupling in FIG. 2, on a larger scale.

The first 40 and second 44 couplings, respectively, comprise an encircling groove 62 in the nut 38 and the boss 43 of the auxiliary frame 8 (see FIG. 6), respectively. A plurality of locking bodies 64, typically in the form of balls, are located in respective through openings 66 in a retainer ring 68. The retainer ring 68 is connected to the flange 34 and the bottom portion 14, respectively.

In the active position, the locking body 64 is located partly in the groove 62, and is prevented from displacing out of the groove 62 through a locking ring 70, which encircles the retainer ring 68 abutting the locking bodies 64. The inner surface of the locking ring 70 is provided with recesses 72. Rotating the locking ring 70 about its axial centre line can bring the recesses 72 into a position that corresponds with that of the locking bodies 64, whereby the locking bodies can be displaced out of engagement with the groove 62 and into the recesses 72.

An electromagnet 74 is arranged to hold the locking ring 70 in the locking position. If the supply of power to the electromagnet 74 is cut a release spring 76 will rotate the locking ring 70 to the released position.

Figure 2:
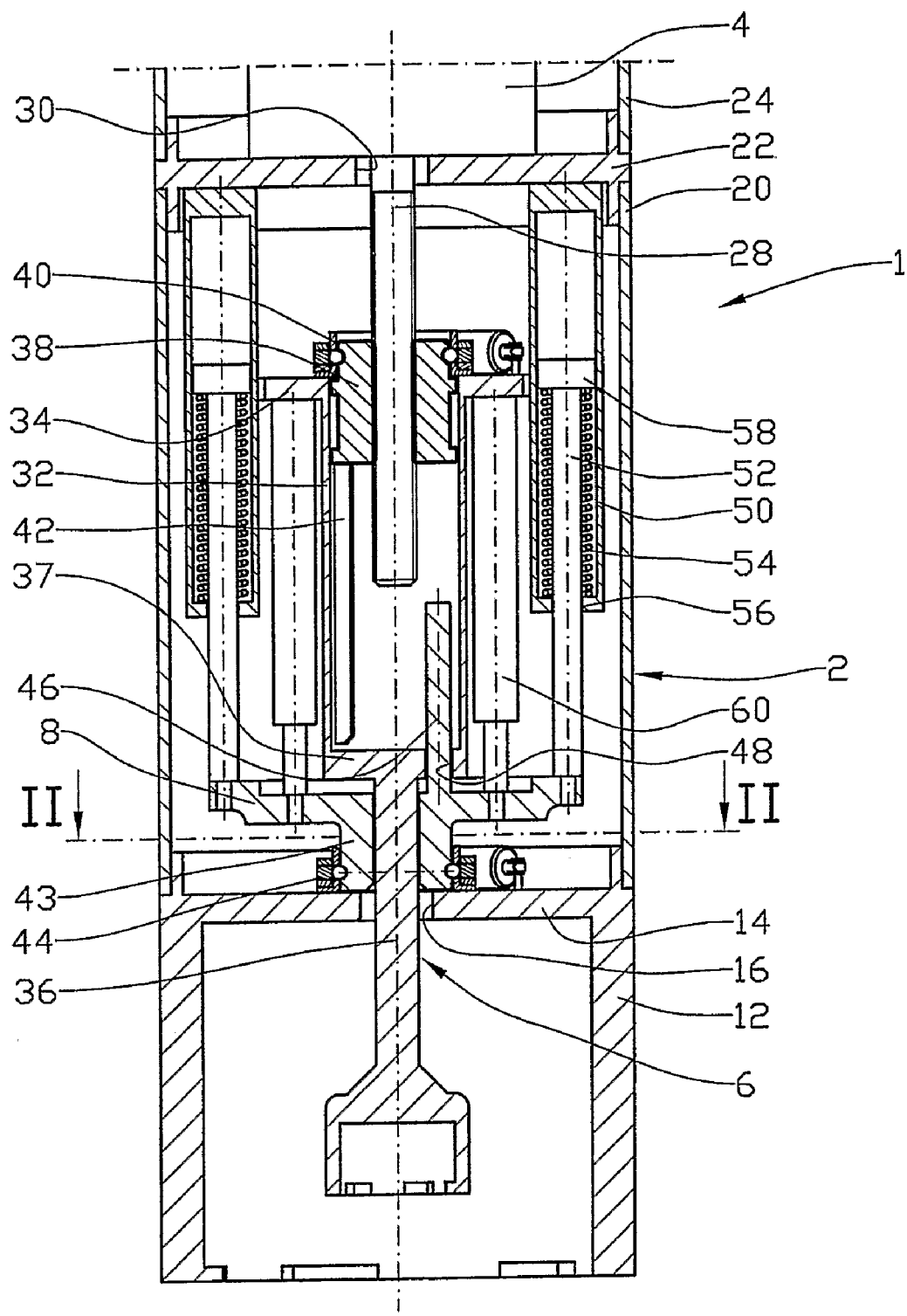
FIG. 2 is a sectional and somewhat scaled-up view of a section of the actuator of FIG. 1, with the actuator spindle in the extended position and the actuator auxiliary frame biased.

FIG. 2 shows the nut 38 coupled to the flange 34 and thereby to the actuator spindle 6. By rotating the motor spindle 28 the motor 4 displaces the nut 38 and the actuator spindle 6 in corresponding directions along the threaded motor spindle 28. In the biased position the auxiliary frame 8 is locked to the bottom portion 14 by the second coupling 44, with the compression springs 54 in the compressed position. In the event that the first and second couplings 40, 44 are disengaged the actuator spindle 6 will be displaced to the retracted position by the compression springs 54, regardless of the position of the nut 38 relative to the motor spindle 28.

Figure 3:
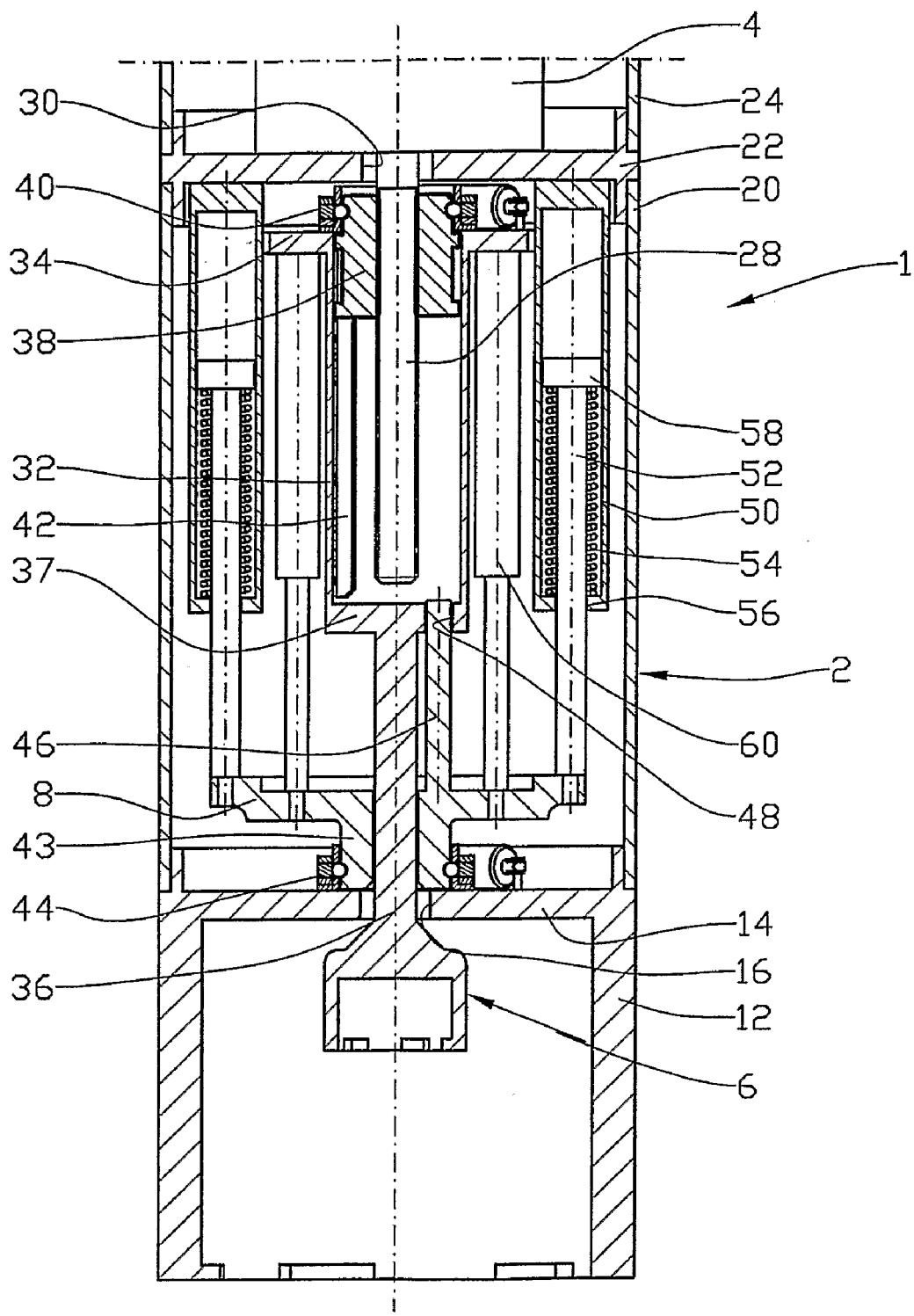
FIG. 3 is a similar view to FIG. 2, but here the actuator spindle is in the retracted position.

In FIG. 3 the actuator spindle 6 has been displaced to its retracted position.

Figure 4:
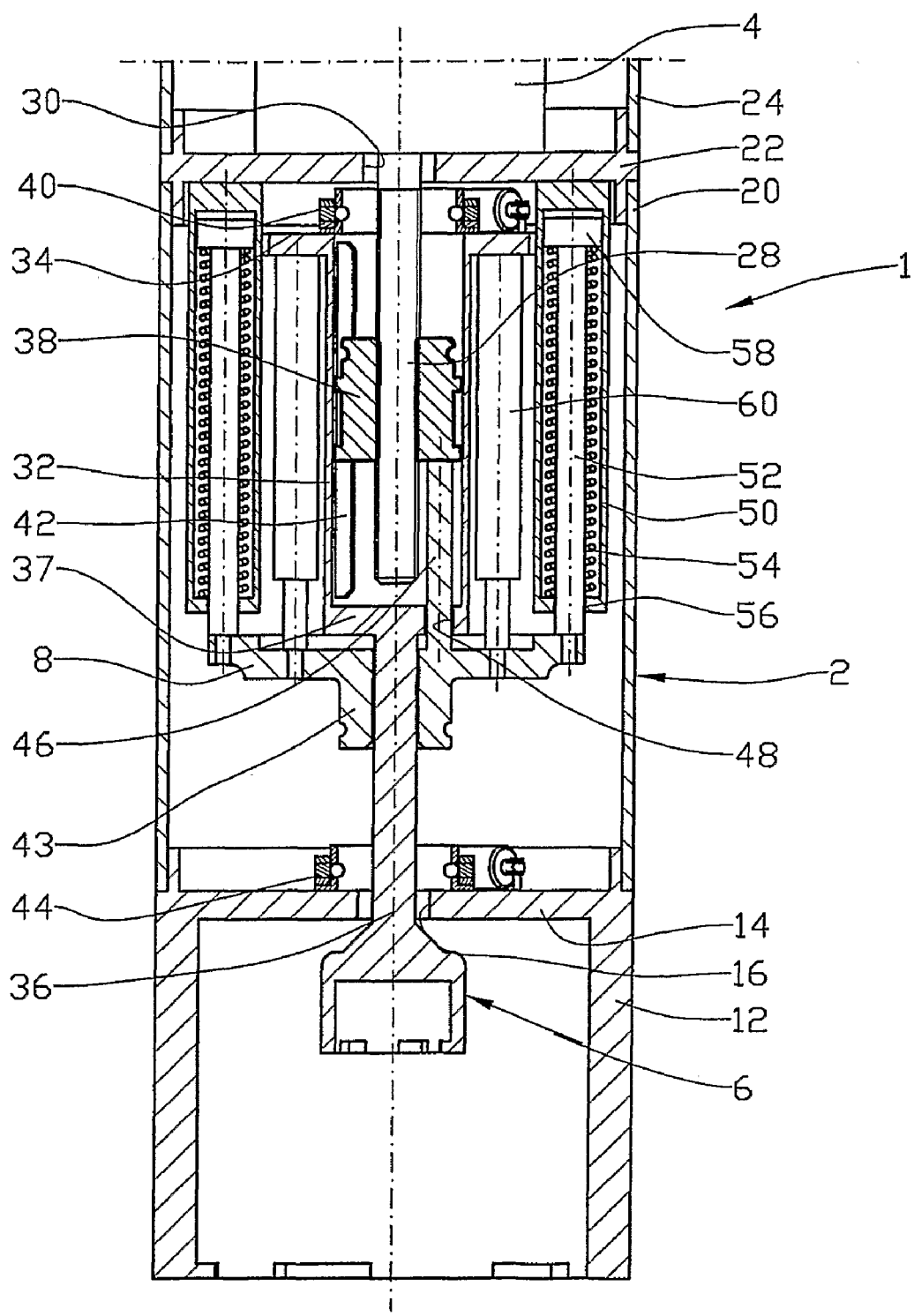
FIG. 4 is a similar view to FIG. 3, but here the auxiliary frame is in the process of being biased.

In FIG. 4 the actuator spindle 6 is still in the retracted position, but here the second coupling 44 has been disengaged, whereby the auxiliary frame 8 is displaced in the direction of the motor 4 by the compression springs. The nut 38 has been disengaged from the actuator spindle 6, as the first coupling 40 is uncoupled. The nut 38 abuts the guide pin 46 and will upon further operation by the motor 4 displace the auxiliary frame towards the bottom portion 14 without displacing the actuator spindle 6. The actuator spindle 6 may be in any position during the clamping of the auxiliary frame 8.

Figure 5:
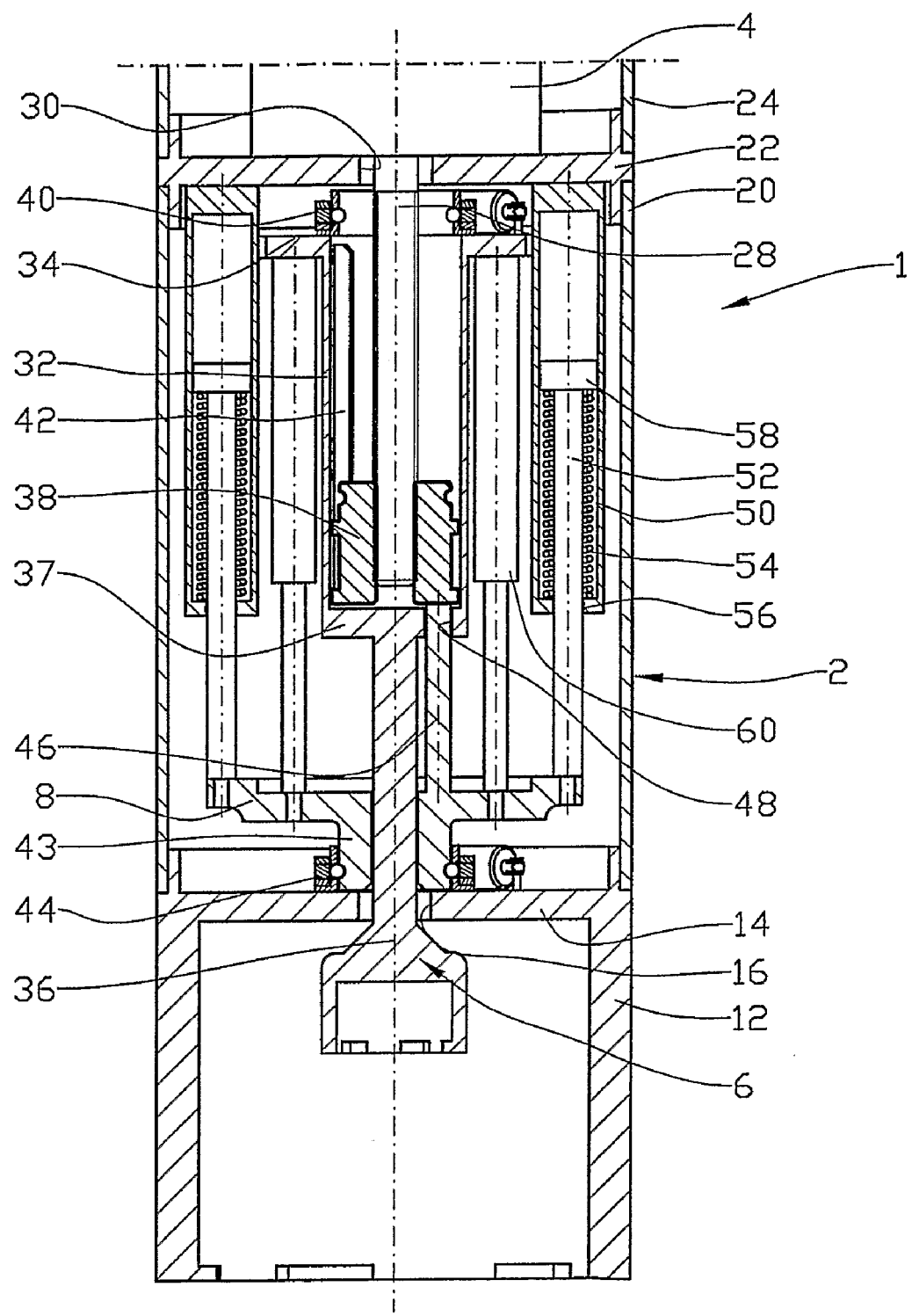
FIG. 5 is a similar view to FIG. 4, but after the auxiliary frame has been biased.

When the auxiliary frame 8 reaches the biased position, see FIG. 5, the second coupling 44 is locked to the auxiliary frame 8, whereby the auxiliary frame 8 remains in the biased position when the nut 38 is displaced in the direction of the motor 4 in order to be re-coupled to the actuator spindle, as shown in FIG. 3.

Figure 7:
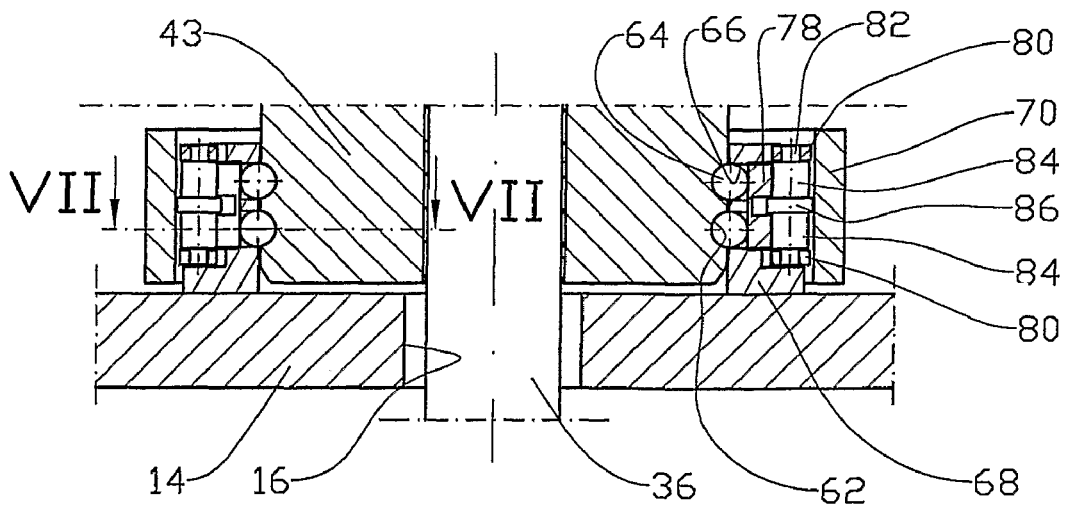
FIG. 7 is a vertical section of an alternative embodiment of a coupling.
Figure 10:
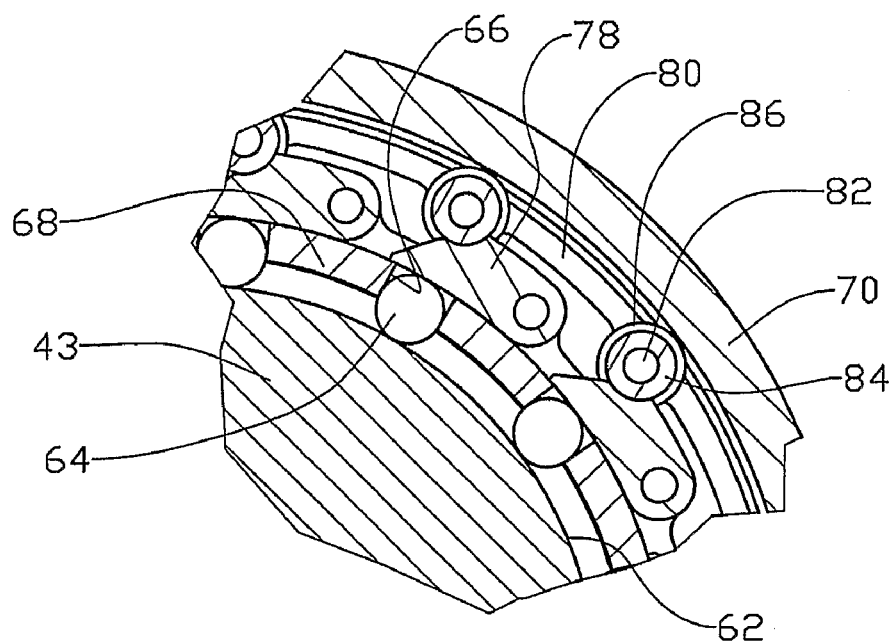
FIG. 10 shows a segment of the coupling of FIG. 7 in the locked position.

In an alternative embodiment of the first and second couplings 40, 44, see FIGS. 7 and 10, each locking body 64 is held in the locked position by a corresponding locking arm 78 which is pivotal supported by the retainer ring 68. The locking arm 78 is held in the locking position by a locking sleeve 84 rotatably supported by an attachment ring 80 via through locking shaft 82.

Figure 11:
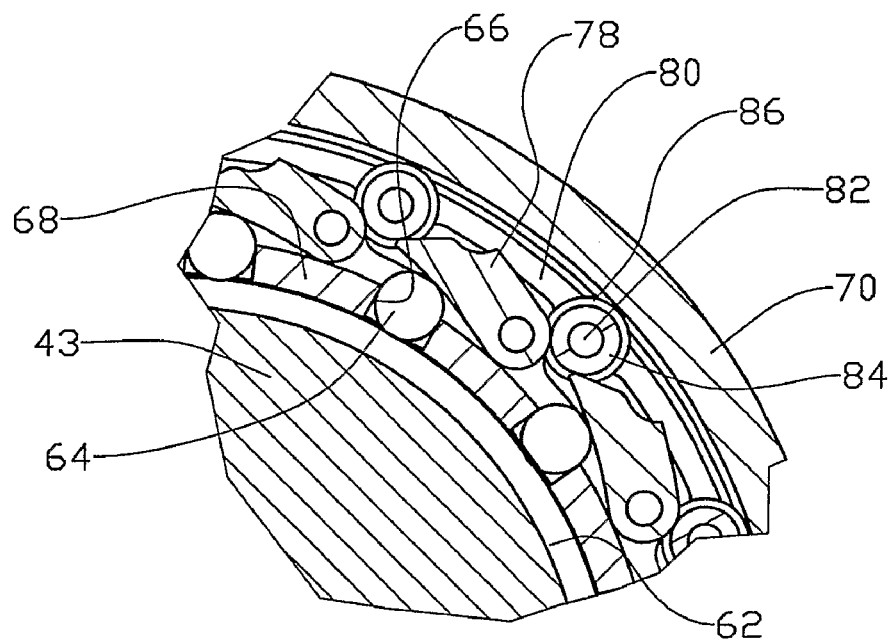
FIG. 11 shows a segment of the coupling of FIG. 7 in the released position.

A lock bearing 86 on each locking shaft 82 abuts the locking ring 70. Rotating the locking ring 70 about its axial centre line will also rotate the attachment ring 80 about the same axis, whereby the locking sleeves 84 roll out of their locking positions relative to the locking arm 78, see FIG. 11, thereby allowing the locking arm to rotate out from its locking position, whereby the couplings 40, 44 are disengaged. A coupling 40, 44 according to this embodiment requires relatively little torque about the locking ring 70 in order to disengage, as all load-bearing connections are rollable.

Figure 8:
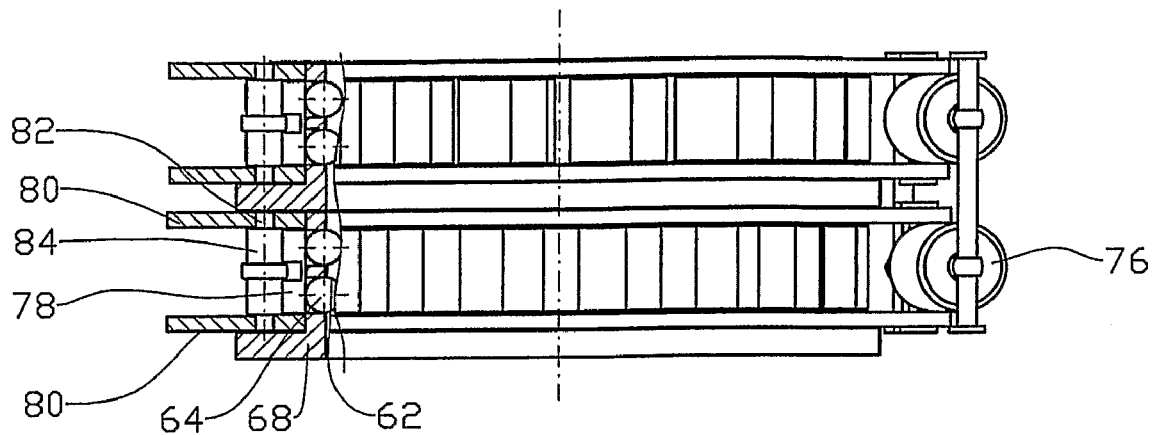
FIG. 8 is a partially sectioned side view of a further embodiment of a coupling.
Figure 9:
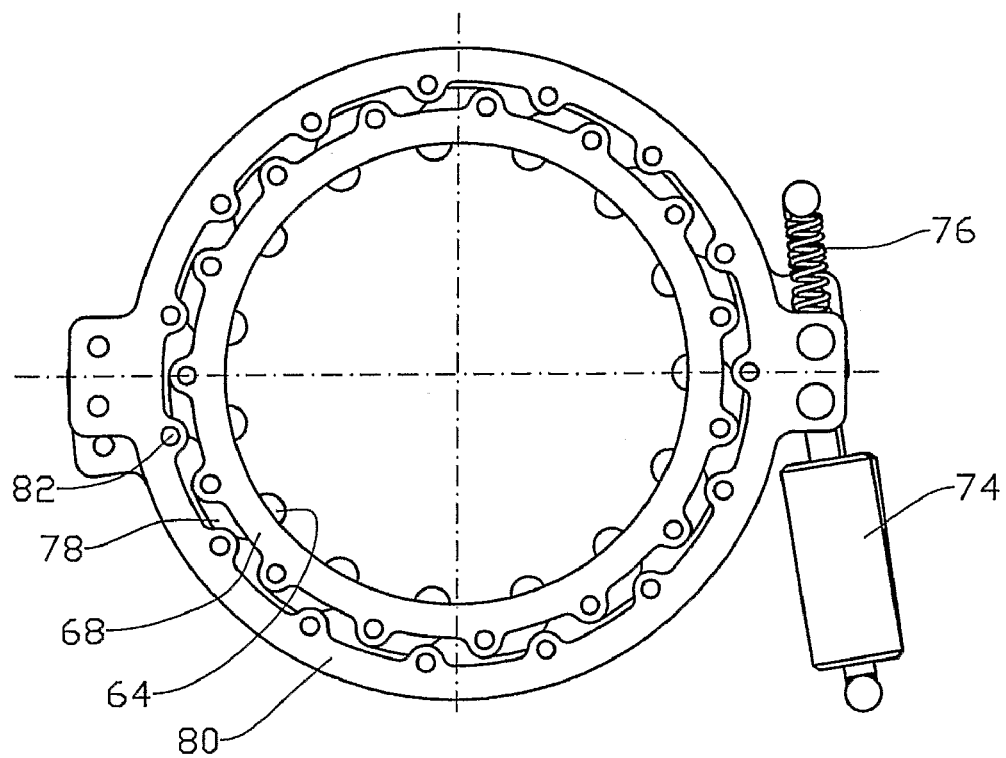
FIG. 9 is a plan view of the coupling of FIG. 8.

In a further embodiment, see FIGS. 8 and 9, two couplings have been put together. In this embodiment the couplings 40, 44 are actuated by rotating the corresponding attachment rings 80.

If one part of the couplings 40, 44 according to this embodiment is provided with locking elements 64 of a lower strength, then this part may serve as a weak link, which can be severed in the event of overloading while the other part of the coupling remains intact.

The invention claimed is:

1. An actuator device comprising:
    an actuator housing, a driving motor attached to said actuator housing, an actuator spindle, and an auxiliary frame having at least one spring;
    said driving motor having a motor spindle being displaceably engaged with said actuator spindle via a nut and said auxiliary frame, such that rotation of said motor produces linear movement of said nut, auxiliary frame and actuator spindle and said nut is releasable from said auxiliary frame to allow linear movement of said auxiliary frame while said nut remains in place relative to said motor spindle, in the event of a power failure;
    said auxiliary frame being arranged to displace said actuator spindle independently of said motor; and
    said at least one spring being arranged to bias said auxiliary frame while disengaged from said motor spindle.

2. A device in accordance with claim 1, further comprising said nut being located in a spindle tube associated with said actuator spindle.

3. A device in accordance with claim 2 further comprising a guide;
    said guide being rigidly mounted to said auxiliary frame and projecting into said spindle tube; and
    said nut abutting said guide such that said guide prevents rotation of said nut relative to said auxiliary frame.

4. A device in accordance with claim 1 further comprising a first coupling and a second coupling;
    said nut and said auxiliary frame being releasably interconnected with said actuator spindle and said actuator housing, respectively, by said first and second coupling, respectively.

5. A device in accordance with claim 4 at least one of said first and second couplings comprising a cylindrical body having one or more grooves for engaging a locking body;
    said locking body being disposed in a through opening in a retainer ring encircling said cylindrical body; and
    said locking body being prevented from displacing out of engagement with said cylindrical body by a locking ring that encircles said retainer ring.

6. A device in accordance with claim 5, said locking ring comprising one or more recesses which can be brought into a position of correspondence relative to said locking body when said locking ring is rotated about an axial centre line of said locking ring and arranged to move out of engagement with said cylindrical body and into said recess.

7. A device in accordance with claim 6, further comprising said locking body abutting a corresponding locking arm, when in a locked position;
    said locking arm being pivotally supported by said retainer ring;
    said locking arm abutting a locking sleeve rotatably supported by an attachment ring via a through locking shaft; and
    said locking shaft having a lock bearing abutting said locking ring.

8. A device according to claim 7 wherein a rotation of said locking ring about an axial centre line of said locking ring will displace said locking sleeve out of a locked position.

9. A device in accordance with claim 7 wherein a rotation of said attachment ring about an axial centre line of said attachment ring will displace said locking sleeve out of a locked position.

10. A device in accordance with claim 5, further comprising said first and second couplings being arranged in parallel.

11. A device in accordance with claim 5, further comprising said locking bodies having different strengths.

12. A device in accordance with claim 5, further comprising said groove encircling said cylindrical body.

13. A device in accordance with claim 5, further comprising said groove running adjacent said cylindrical body.

* * * * *